United States Patent [19]

Schiess

[11] Patent Number: 5,372,204
[45] Date of Patent: Dec. 13, 1994

[54] POWER TRACTOR HITCH RELIEF SYSTEM

[76] Inventor: Ulrich Schiess, 1303 Highway 20-E, Colville, Wash. 99114

[21] Appl. No.: 16,053

[22] Filed: Feb. 9, 1993

[51] Int. Cl.[5] .............................. A01B 63/11
[52] U.S. Cl. ............................ 172/11; 137/45; 172/260.5
[58] Field of Search ............... 172/2, 4, 4.5, 5, 11, 172/7, 260.5, 261, 263, 677, 439; 137/45, 46; 56/DIG. 6, DIG. 14; 280/754, 755, 758, 759; 37/234

[56] References Cited

U.S. PATENT DOCUMENTS

| | | | |
|---|---|---|---|
| 1,272,285 | 7/1918 | Manley | 137/45 |
| 2,405,980 | 8/1946 | Sands et al. | 280/33.44 |
| 2,442,458 | 6/1948 | Ferguson | 280/33.4 |
| 2,790,365 | 4/1957 | Bunting | 137/45 |
| 3,529,872 | 9/1970 | Mitton | 137/45 |
| 3,573,221 | 10/1971 | Romig | 172/261 |
| 3,582,153 | 6/1971 | Pitcher | 137/45 |
| 3,786,871 | 1/1974 | Long et al. | 172/4.5 |
| 3,876,012 | 4/1975 | Regier | 172/4.5 |
| 3,901,323 | 8/1975 | Mueller | 172/7 |
| 4,132,273 | 1/1979 | Mortonson et al. | 172/2 |
| 4,266,616 | 5/1981 | Mueller | 172/7 |
| 4,289,208 | 9/1981 | Roncarolo | 172/7 |
| 4,299,530 | 11/1981 | Schaeff | 414/719 |
| 4,425,970 | 1/1984 | Dwyer et al. | 172/7 |
| 4,508,178 | 4/1985 | Cowell et al. | 172/239 |
| 4,664,404 | 5/1987 | Schultz | 280/461 A |
| 4,825,956 | 5/1989 | Kanato et al. | 172/2 |
| 5,224,551 | 7/1993 | Sukup | 172/2 |

*Primary Examiner*—Randolph A. Reese
*Assistant Examiner*—Spencer Warnick
*Attorney, Agent, or Firm*—Wells, St. John, Roberts, Gregory & Matkin

[57] ABSTRACT

A power hitch relief system for a three-point hitch used in tractors and similar vehicles. The power hitch relief system includes an inclination detector in the form of a weight pivotally mounted to the tractor frame. The weight is also coupled to a relief valve of a hydraulic circuit which supplies power to the hitch. The weight pivots when the tractor pitches backwardly to open the relief valve and relieve fluid pressure in the hydraulic circuit. This prevents the tractor from overturning backwardly. A catch keeps the relief valve open to prevent oscillations until reset.

19 Claims, 4 Drawing Sheets

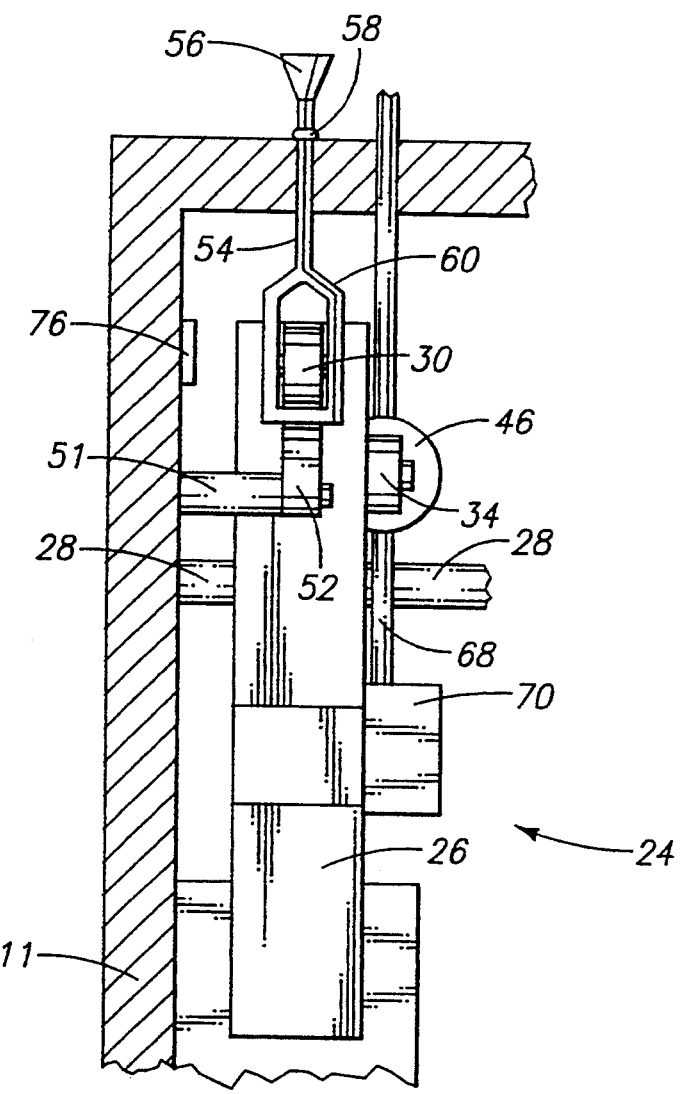
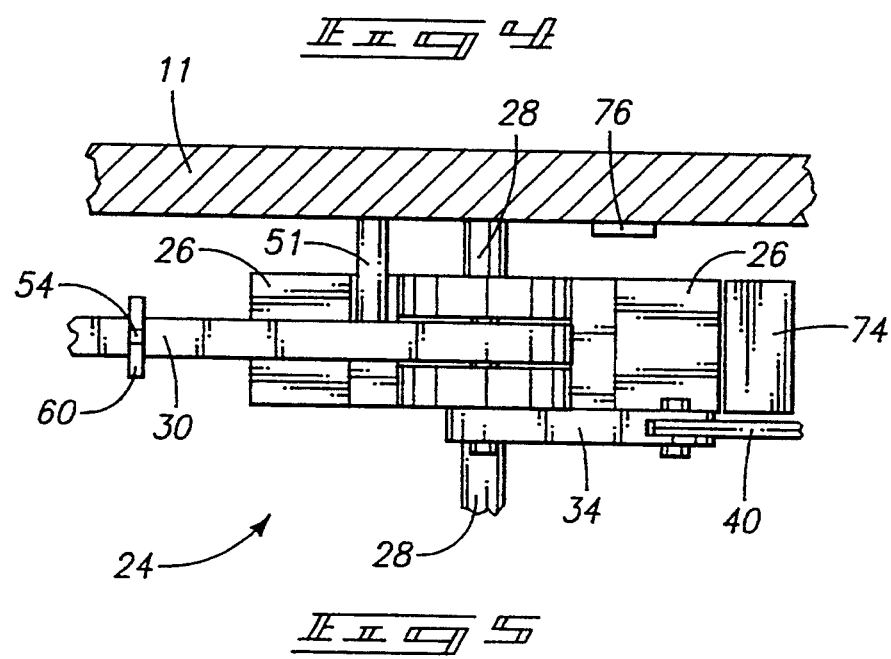

5,372,204

POWER TRACTOR HITCH RELIEF SYSTEM

TECHNICAL FIELD

This invention relates to devices for preventing tractors or similar vehicles from tipping over due to forces developed by power lift hitches, such as three-point hitches.

BACKGROUND OF THE INVENTION

Utility vehicles, such as tractors, have long been used to pull many different trailing implements for performing a variety of tasks in the field. Tractors in particular typically include a powered hitch for attaching and adjustably raising and lowering the trailing implement. Such adjustable power hitches also typically provide significant forces which help to control the draft of agricultural implements and the like. The power hitch lifts are frequently used by tractor operators to do more general work, such as lifting loads and performing a variety of miscellaneous chores around a farm, woodlot, or other work area.

A common type of adjustable power hitch is a three-point hitch. A three-point hitch typically includes a pair of lifting linkage members or links. Each lifting link is pivotally mounted to the vehicle at the forward end and coupled to a trailing implement at an opposite or rearward end, such as by using lifting link pins. The lifting links are usually powered upwardly and downwardly. In addition, three-point hitches include an adjustable upper link which stabilizes the trailing implement against rotation about the lifting link pins.

Most three-point hitches are powered hydraulically. Typically, a hydraulic circuit provides pressurized hydraulic fluid to the lifting links via two crank arms mounted for pivotal action in the transmission and rear differential housing. The crank arms are connected to the lifting links via adjustable lifting link connection bars. Pressurized fluid powers the lifting linkage members when the implement is to be raised. The lifting linkage members are typically powered downward or can merely be lowered as a result of hydraulic pressure being released from the circuit.

Tractors utilizing three-point hitches have heretofore suffered from a tendency to overturn when a large load or resistance is applied in a lifting mode of operation. This is a particular problem on hills or where the hitch is used to lift on stumps or loads which are excessive. Lifting on a stump while the tractor is oriented with the front end uphill can cause the tractor to completely overturn backward, causing severe injury and death to the operator.

Accordingly, there remains a substantial need to provide a device that will effectively prevent such rearward tipping of a tractor due to forces developed in part by the power hitch and in part by the tractor drive wheels.

BRIEF DESCRIPTION OF THE DRAWINGS

One or more preferred forms of the invention are described herein with reference to the accompanying drawings. The drawings are briefly described below.

FIG. 4 is a partial front sectional view, taken along line 4—4 of FIG. 2.

FIG. 5 is a partial top sectional view, taken along line 5—5 of FIG. 2.

DETAILED DESCRIPTION OF THE PREFERRED EMBODIMENTS

This disclosure of the invention is submitted in furtherance of the constitutional purposes of the U.S. Patent Laws "to promote the progress of science and useful arts." U.S. Const. art. 1, §8.

Figure 1:
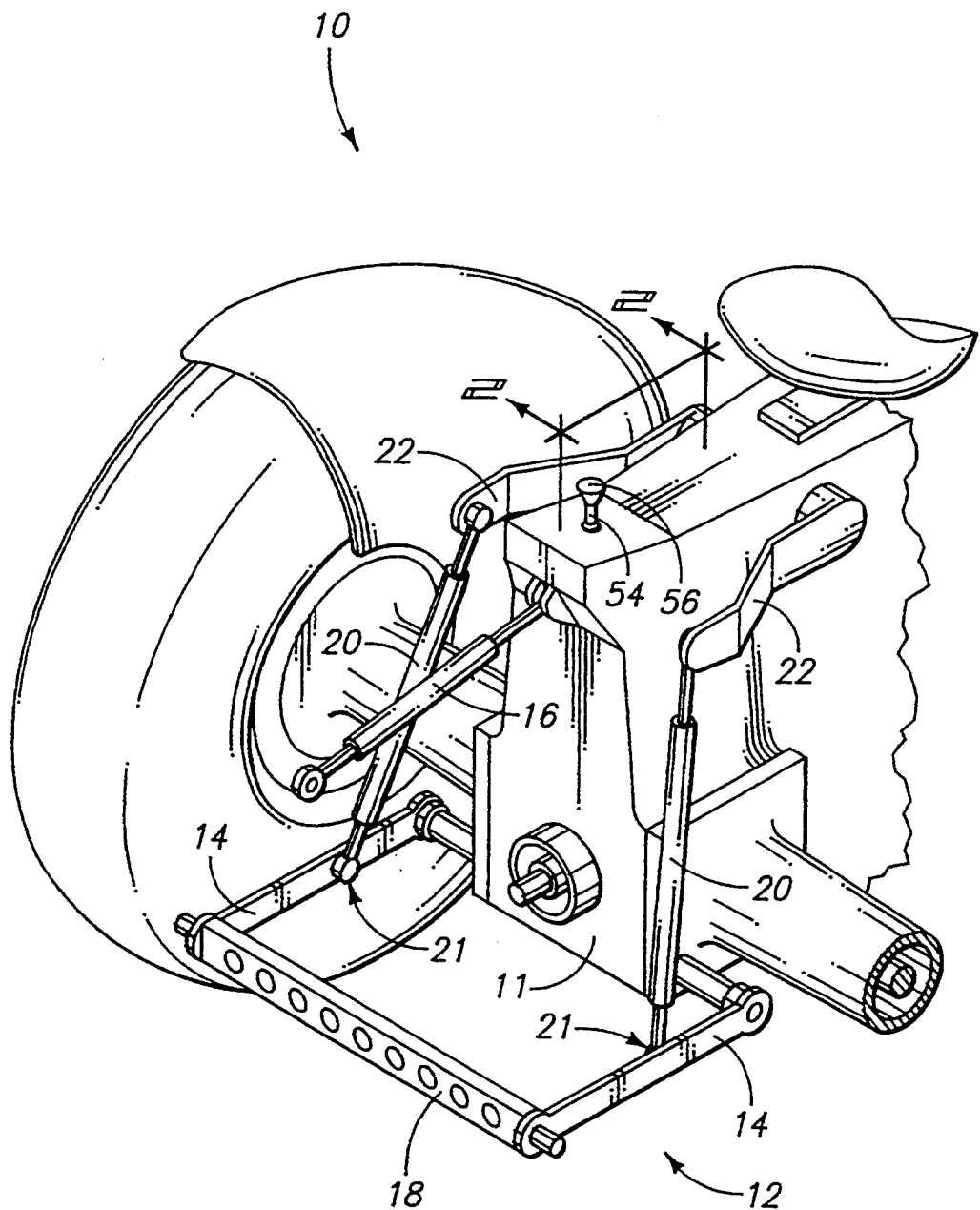
FIG. 1 is a partial isometric view of a vehicle including a preferred embodiment of a power tractor hitch relief system according to the present invention.

FIG. 1 shows a preferred tractor 10 including a three-point hitch 12. The hitch is used to mount an implement and occasionally for various lifting chores. The three-point hitch 12 preferably includes a pair of lower lifting links or support arms 14, and an adjustable upper tie rod or support arm 16. The lower support arms 14 are pivotally coupled at one end to the vehicle frame 11 and at opposite distal ends to a tool bar 18. Tool bar 18 includes a plurality of mounting locations for attaching a variety of implements. The upper arm 16 is coupled at one end to the vehicle frame 11. The distal end of upper arm 16 includes an eyelet for mounting to an upper portion (not shown) of a trailing implement held by the hitch.

Hitch 12 also includes lift connection rods 20 which extend generally upward from pivotal connections 21 with the lifting links 14. The upper ends of connection rods 20 are pivotally connected to the lift actuator. As shown, the lift actuator is in the form of lift or actuator arms 22, which are pivotally mounted to the vehicle frame 11 and powered internally to raise and lower. In the preferred embodiment, the actuator arms 22 are operatively coupled to a hydraulic circuit (FIGS. 2, 3) which controllably supplies hydraulic fluid pressure to a hydraulic motor which moves actuator arms 22 for moving the arms up or down about their respective mounting locations.

A three-point hitch, such as hitch 12 shown in FIG. 1, provides a stable, triple-mount device for attaching a trailing implement to a vehicle. A trailing implement is generally first mounted to the lower support arms 14, either directly or by means of tool bar 18. The upper arm 16 is then adjusted to the proper length and coupled to the trailing implement at a location above and between the lower support arms to form a triangular mounting arrangement. Movement of the actuator arms 22 causes the connecting rods 20 to lower or raise the lifting arms 14 and the attached trailing implement. This arrangement allows an implement to be partially or fully supported on the hitch.

As shown in FIGS. 2-5, the present invention includes a power hitch relief system 24 for use with the described and similar three-point hitches to prevent the tractor from pitching and overturning backwards. The relief system 24 includes an inclination detector which preferably includes a weight 26 pivotally coupled to the vehicle frame by a shaft 28 which is transverse to the longitudinal axis of the tractor. The weight is sensitive to rearward tipping of the vehicle and will pivot about shaft 28 when backward tipping occurs.

An upper narrowed end of the weight 26 is pivotally coupled to a catch arm 30 at pivot point 32. The catch arm 30 includes a ratchet mechanism in the form of a plurality of teeth 50 extending downwardly from the catch arm 30. Each tooth has a first or forward sloping edge and a second or rearward vertical edge. An end of the catch arm opposite pivot point 32 rides in an aperture formed by a lower portion 60 (FIG. 4) of a release slide bar 54. A keep or catch 52 having a frontward vertical edge and a sloping rearward edge is mounted to the vehicle frame just below the catch arm. The rearward sloping edge of the keep 52 engages with the sloping frontward edges of the teeth 50 so that when the catch arm moves a sufficient amount relative to the keep, the sloping surface of the teeth will ride up over the sloping surface of the keep and lock the catch arm in position relative to the keep.

With reference to FIG. 4, the invention advantageously includes a release bar 54 for releasing the ratchet teeth 50 on the catch arm 30 from the keep 52. The release bar passes through a top wall of the vehicle frame 11 or a housing mounted to the vehicle frame. Release 54 advantageously includes a knob 56 at the top to facilitate grasping and lifting. An annular flange portion 58 is also formed on the release bar 54 to act as a stop and maintain the lever at a desired fully depressed position. As best shown in FIG. 4, release bar 54 includes a hoop portion 60 which forms a hoop or loop having an interior aperture or channel for slidably receiving the catch arm 30 therethrough. The channel portion 60 is generally oversized relative to the cross-sectional size of catch arm 30 to allow the catch arm to ride back and forth within the channel portion.

When the weight has rotated sufficiently (clockwise in FIGS. 2 and 3) for one of the teeth 50 to engage the keep 52, the catch arm 30 can be released after the tipping condition has been eliminated by manually lifting the release bar 54 in an upward direction. The weight 26 will pivot by gravity about shaft 28 and the catch arm 30 will slide generally horizontally through the channel 60 of the release bar 54. The catch arm 30 pivots relative to the weight 26 about pivot point 32 in order for the weight to return to its neutral position associated with a level condition of the tractor.

As shown, the relief system 24 also advantageously includes a dual-pivot relief linkage member 34. Relief linkage member 34 is pivotally connected at one end to weight 26 at pivot pin 36 and pivotally connected at an opposite end to a valve control arm in the form of a piston rod 40. Pivot pin 36 is located on the narrowed upper portion of the weight 26 between the mounting location of the shaft 28 and pivot point 32. The dual-pivot member allows the weight to swing toward the rear of the vehicle frame 11 (left as shown in FIG. 3.) while maintaining the piston rod 40 in alignment with the cylinder 46 of the piston-cylinder valve assembly 42 (discussed in greater detail below).

A preferred embodiment of the present invention includes a block 74 coupled to the vehicle frame 11. The block 74 acts as a stop and prevents the weight from tipping in a forward direction so that the weight will swing only as a result of backward tipping or sufficient uphill inclination of the vehicle. The block 74 can be mounted in any conventional manner to any suitable portion of the vehicle frame 11.

Figure 2:
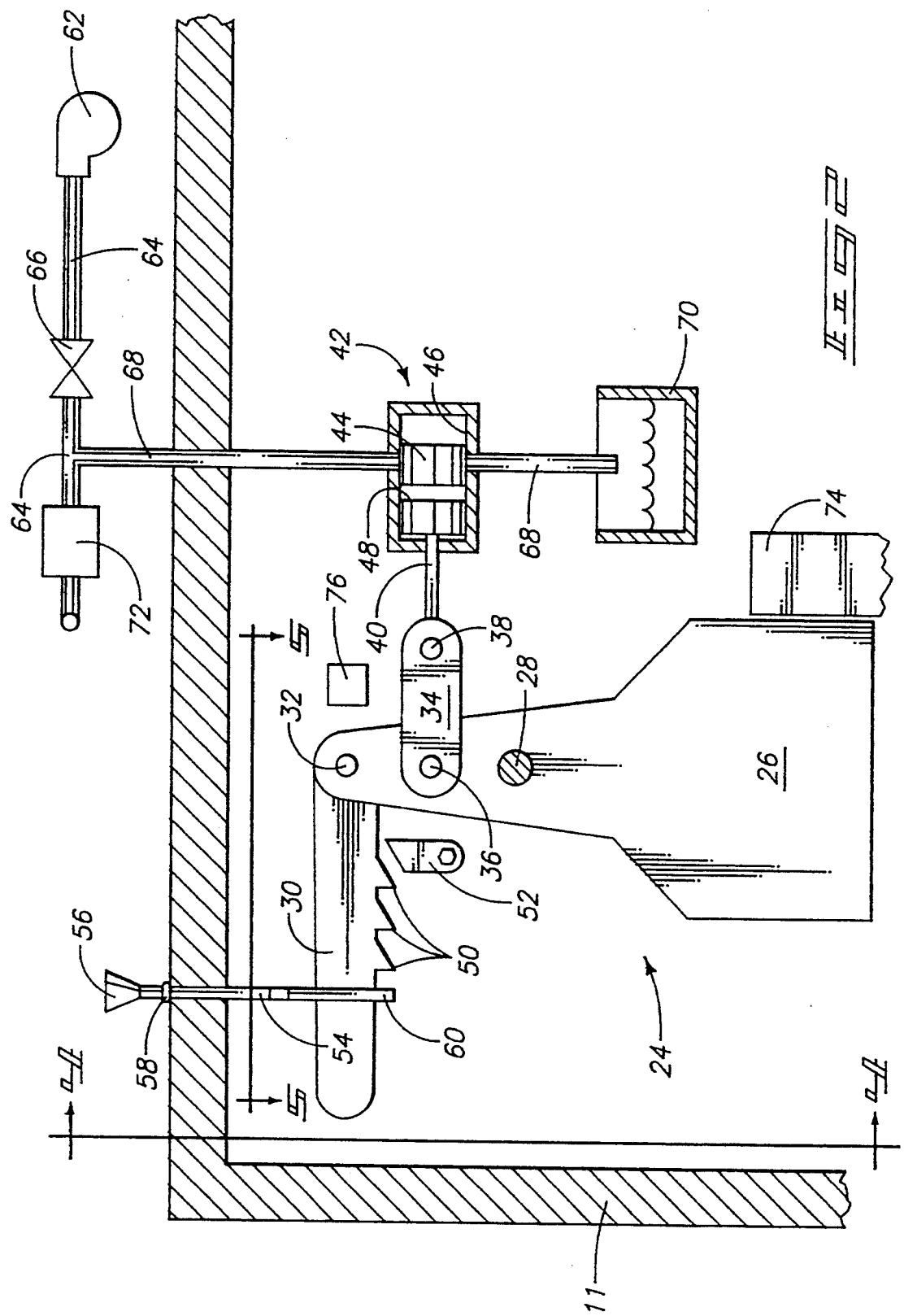
FIG. 2 is a side sectional view, taken along cutting plane 2—2 of FIG. 1. The power hitch relief system is shown with a hydraulic relief valve forming a part thereof in a closed position.
Figure 3:
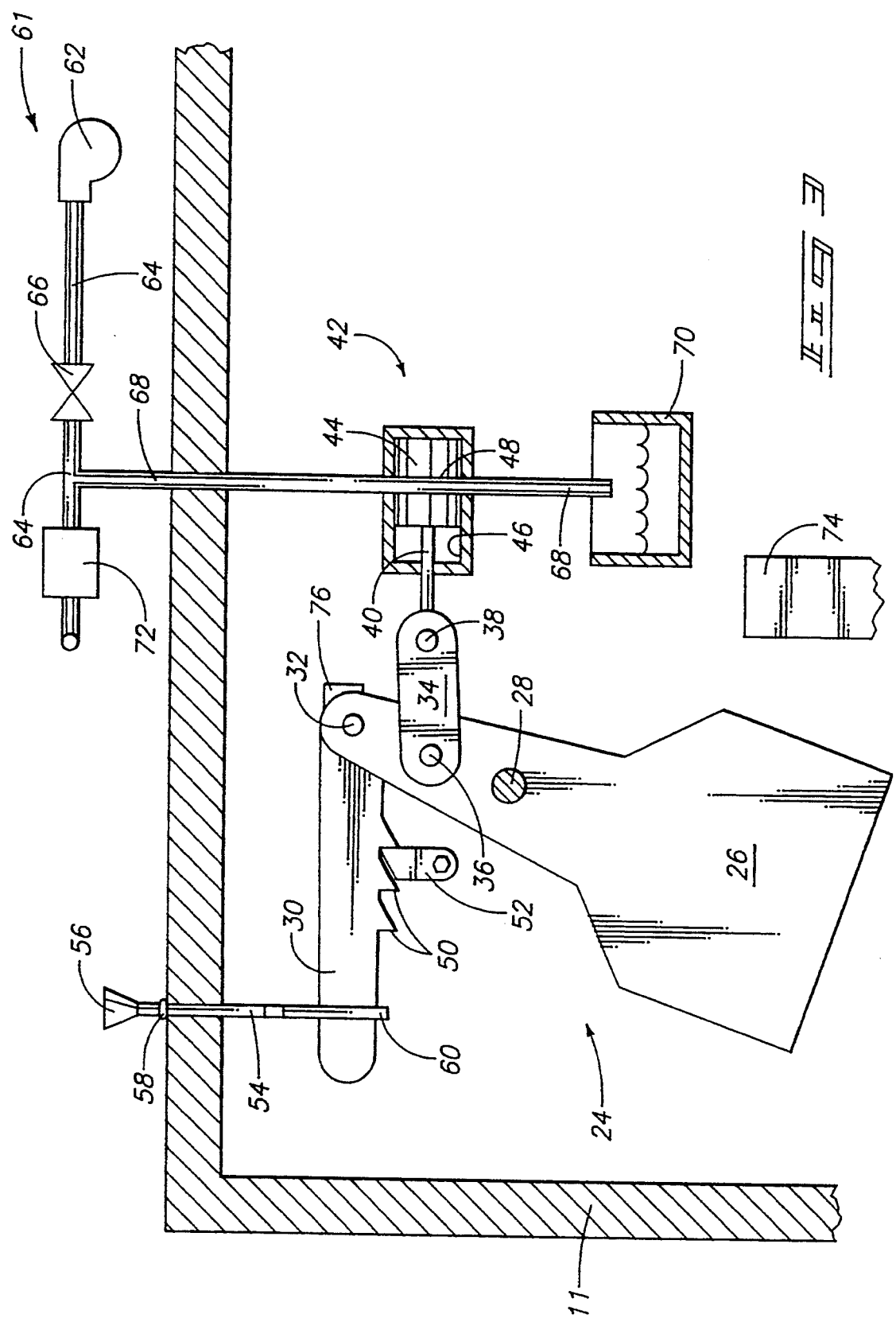
FIG. 3 is a side sectional view, similar to FIG. 2 showing the hydraulic relief valve in an open position.

Referring to FIGS. 2 and 3, the hydraulic relief valve assembly 42 of the present invention generally comprises a piston 44 concentrically aligned for axial movement within a cylinder 46. A piston rod or other valve control arm 40 is coupled to one end of the piston. The control arm provides the actuating force which moves the piston within the cylinder.

The piston 44 includes a passageway 48 extending through the piston 44. The cylinder 46 includes opposed openings to a branch hydraulic line 68, which steins from a main hydraulic line 64 of the hydraulic circuit 61. Upon actuation of the valve control arm 40, the piston rides within the cylinder and moves from a neutral position (i.e., when the weight is generally in a vertical position as shown in FIG. 2) to an activated position with the passageway 48 of the piston aligned with the cylinder openings to branch line 68.

A hitch lift actuator is connected to three-point hitch 12 as shown in FIG. 1. This hitch lift actuator is advantageously powered by means of a hydraulic fluid circuit 61, as shown in FIG. 3. Hydraulic fluid pressure is supplied to a hitch lift drive mechanism 72 which produces a torque upon the hitch lift arms 22. The hydraulic fluid circuit includes a hydraulic pump 62 coupled to a hydraulic fluid supply line 64. A control valve 66 is included to control hydraulic pressure supplied to the hitch lift actuator drive 72. A branch line 68 stems from the supply line 64 downstream of the control valve 66 and leads to the relief valve 42.

Actuation of relief valve 42 into an open condition causes the valve to act as a relief which serves to relieve pressure in the hydraulic supply line 64. The branch line 68 terminates at a hydraulic fluid reservoir 70 downstream of the relief valve 42. A return line (not shown) is included in circuit 61 to return hydraulic fluid from reservoir 70 to pump 62. Passageway 48 of the relief valve is aligned with the branch line 68 when the valve is open. Hydraulic fluid pressure in the hydraulic fluid supply line 64 is relieved through branch line 68 by directing fluid into reservoir 70. The release of hydraulic pressure from the supply line 64 will cause the actuator arms 22 (FIG. 2) to return, thus lowering the pitched tractor so that the front returns to the ground.

The present invention may also include an optional sensor 76 approximately connected to the vehicle frame adjacent the top end of the weight 26. The sensor 76 is provided to detect a predetermined amount of inclination as sensed from the movement of the weight 76, thus signaling a tipping condition. The sensor may be operatively coupled through a relay to the power supply source of the vehicle to terminate the supply of power to the vehicle if a tipping condition occurs. The sensor 76 could be mounted in any desirable location to sense movement of the weight 26. The sensor 76 could be any conventional sensor, such as an optical sensor, electrical switch or other sensor type.

The power hitch release system 24 is shown in FIGS. 1-5 as being mounted within a housing portion of the vehicle frame 11, such as the differential housing. It should be understood, however, that the relief system 24 could alternatively be mounted to the vehicle frame in a variety of manners. Specifically, the power hitch relief system could alternatively be mounted on the exterior of the vehicle frame. In the preferred embodiment, however, mounting the relief system 24 within an enclosed area, such as the differential housing, prevents external factors unrelated to vehicle tipping from affecting the movement of the weight and other interconnected members, thereby providing a highly accurate inclination detection function specific to frontal pitch of the tractor.

In operation, the power hitch relief system 24 becomes automatically operative when the vehicle becomes pitched with the front end upwardly. Such a situation may arise when the power hitch is applying a lifting force to a heavy object and the vehicle is traveling up or being started up an inclined surface. In such a backwardly pitched position of the tractor, the weight 26 swings from its neutral position (FIG. 2) toward the rear of the vehicle 10 into a displaced position as shown in FIG. 3. As the weight pivots about shaft 28, the dual-pivot connecting member 34, the piston rod 40, and the piston 44 are forced toward the front of the vehicle and in a manner directed toward opening the relief valve 42. If a preset or predetermined amount of tipping is encountered, the passageway 48 of the piston 44 will become aligned with the branch hydraulic line 68. This will relieve pressure within the hydraulic fluid supply line 64 with relieved hydraulic fluid flowing into fluid reservoir 70. The relief of fluid pressure in the fluid circuit 31 causes the actuator arms 22 of the hitch 12 to move toward the ground and lower the lifting link arms 14 relative to the tractor to thereby prevent overturning, lower the tractor front end, and remedy the tipping condition If sufficiently displaced, the weight is held in a displaced position by the catch, specifically by one of the plurality of teeth 50 of the catch arm 30. This prevents upward and downward oscillation of the tractor. The particular tooth engages keep 52 mounted to the frame of the vehicle to maintain the passageway in alignment with the branch line and maintain the relief valve 42 in an open position until cause of the tipping condition can be eliminated. Once the condition has been remedied, upward movement of the release bar 54 will lift the distal rear end of catch arm 30 thus freeing teeth 50 above keep 52 and allow the weight 26 to pivot about shaft 28 and return to its neutral position.

In compliance with the statute, the invention has been described in language necessarily limited in its ability to properly convey the conceptual nature of the invention. Because of this inherent limitation of language, it must be understood that the invention is not necessarily limited to the specific features described, since the means herein disclosed comprise merely preferred forms of putting the invention into effect. The invention is, therefore, claimed in any of its forms or modifications within the proper scope of the appended claims appropriately interpreted in accordance with the doctrine of equivalents.

I claim:

1. A tractor, comprising:
   a frame;
   drive wheels connected to the frame;
   a power hitch pivotally coupled to the frame, the power hitch being capable of powered action which creates a rotational moment about the drive wheels which tends to overturn the frame;
   a power hitch actuator coupled to the power hitch to power said action of the hitch;
   an inclination detector for detecting a preset excessive angle of pitch of the tractor; said inclination detector including a weight;
   a relief valve operatively connected to the inclination detector so that the relief valve is activated into an open position when the inclination detector detects said preset excessive angle; said relief valve opening into an open position to relieve hydraulic pressure from the power hitch actuator to disable power to the power hitch when said relief valve is activated by the inclination detector;
   a catch for holding the weight in a tilted position to maintain the relief valve in said open position.

2. A tractor according to claim 1 wherein said inclination detector is a weight pivotally mounted to the frame.

3. A tractor according to claim 1 and further comprising:
   a release for releasing the catch to free the weight.

4. A tractor according to claim 1 and further comprising a block coupled to the tractor in front of the weight; the block preventing the weight from moving in response to frontal downward pitch of the tractor.

5. A vehicle including a power hitch according to claim 1 wherein the relief valve comprises a piston and a cylinder, the piston having a passageway and the cylinder having openings to a relief hydraulic fluid line; wherein said passageway aligns with the cylinder openings upon movement of the weight to open the relief hydraulic fluid line.

6. A power hitch relief system for a tractor with a hydraulically powered hitch having a hydraulic hitch actuator, comprising:
   an inclination detector for detecting a preset excessive angle of pitch of the tractor; said inclination detector having a weight which is pivotally mounted for pivotal motion relative to said tractor when mounted thereon;
   a relief valve operatively connected to the inclination detector so that the relief valve is activated into an open position when the inclination detector detects said preset excessive angle of pitch; said relief valve also being operatively connected to the hydraulic hitch actuator to relieve hydraulic power to the hitch when the relief valve is activated into said open position;
   a catch for holding the relief valve in the open position.

7. A power hitch relief system according to claim 6 and further comprising a block for mounting to the tractor to prevent the weight from moving in response to forward downward pitch of the tractor.

8. A power hitch relief system according to claim 6 and further comprising a release for releasing the catch.

9. A power hitch relief system according to claim 8 and further comprising a block for mounting to the tractor to prevent the weight from moving in response to forward downward pitch of the tractor.

10. A power hitch relief system according to claim 6 wherein the relief valve comprises a piston and a cylinder, the piston having a passageway and the cylinder having openings to a relief hydraulic fluid line; wherein said passageway aligns with the cylinder openings upon movement of the weight to open the relief hydraulic fluid line.

11. A tractor, comprising:
   a frame;
   drive wheels connected to the frame;
   a power hitch coupled to the rear of the frame, the power hitch being capable of powered action which creates a rotational moment about the drive wheels which tends to pitch the front of the frame upward;
   a power hitch actuator coupled to the power hitch to power said action of the hitch;
   an inclination detector for detecting a preset excessive angle of upward frontal pitch of the tractor;
   a relief valve operatively connected to the inclination detector so that the relief valve is activated when the inclination detector detects said preset excessive angle; said relief valve being operatively connected to the power hitch actuator to relieve pressure developed by the power hitch when said relief valve is activated by the inclination detector.

12. A tractor according to claim 11 and further comprising a catch for holding the relief valve in said open position.

13. A tractor according to claim 11 and further comprising:
a catch for holding the relief valve in said open position;
a release for releasing the catch.

14. A tractor according to claim 11 wherein said inclination detector includes a weight mounted to the frame for pivotal motion.

15. A tractor according to claim 14 and further comprising a catch for holding the weight in a tilted position to maintain the relief valve in said open position.

16. A tractor according to claim 14 and further comprising a stop for preventing the weight from moving in response to downward frontal pitch of the tractor.

17. A power hitch relief system for a tractor with a hydraulically powered hitch having a hydraulic hitch actuator, comprising:
an inclination detector for detecting a preset excessive angle of upward frontal pitch of the tractor; said inclination detector having a weight with a pivotal mounting for allowing the weight to move in response to forward upward pitch of a tractor when the power hitch relief system is mounted therein;
a relief valve operatively connected to the inclination detector so that the relief valve is activated into an open position when the inclination detector detects said preset excessive angle of pitch; said relief valve also being operatively connected to the hydraulic hitch actuator to relieve hydraulic power to the hitch when the relief valve is activated into said open position;
a catch for holding the relief valve in the open position.

18. A power hitch relief system according to claim 17 and further comprising a block for mounting upon the tractor to prevent the weight from moving in response to forward downward pitch of the tractor.

19. A power hitch relief system according to claim 18 and further comprising a release for releasing the catch.

* * * * *